United States Patent [19]
Goehner et al.

[11] Patent Number: 5,458,152
[45] Date of Patent: Oct. 17, 1995

[54] SELF-CLOSING WATER VALVE

[75] Inventors: Joerg Goehner, Boeblingen; Helmut Schneider, Leinfelden-Echterdingen; Max Wolff, Filderstadt, all of Germany

[73] Assignee: Robert Bosch GmbH, Stuttgart, Germany

[21] Appl. No.: 199,079

[22] Filed: Feb. 22, 1994

[30] Foreign Application Priority Data

Mar. 5, 1993 [DE] Germany .................. 43 06 866.9

[51] Int. Cl.⁶ .................................................. F16K 21/06
[52] U.S. Cl. .................... 137/624.12; 137/630.14; 251/15
[58] Field of Search .................... 137/630.14, 630.15, 137/624.12; 251/15

[56] References Cited

U.S. PATENT DOCUMENTS

| | | | |
|---|---|---|---|
| 793,698 | 7/1905 | Walter | 137/630.14 |
| 1,096,220 | 5/1914 | Brooks | 137/630.15 |
| 2,899,935 | 8/1959 | Dalton | 137/630.14 X |
| 4,073,314 | 2/1978 | Speelman | 251/368 X |
| 4,088,147 | 5/1978 | Krechel | 251/368 X |
| 4,335,852 | 6/1982 | Chow | 137/624.12 X |
| 4,475,578 | 10/1984 | Nidle | 251/368 X |

FOREIGN PATENT DOCUMENTS 360534  11/1931  United Kingdom .............. 251/15

*Primary Examiner*—Robert G. Nilson
*Attorney, Agent, or Firm*—Michael J. Striker

[57] ABSTRACT

A self-closing water valve has a valve seat, a valve closing member cooperates with the valve seat so as to abut against and to be lifted from the valve seat, and an auxiliary valve coupled with the valve closing member for reducing operational forces during lifting of the valve closing member from the valve seat and therefore opening the valve.

9 Claims, 4 Drawing Sheets

1
SELF-CLOSING WATER VALVE

BACKGROUND OF THE INVENTION

The present invention relates generally to self-closing water valves.

More particularly, it relates to a self-closing water valve with a valve closing member formed for example as a valve plate with a shaft and closing or releasing a valve seat.

Self-closing water valves identified also as water quantity regulators are known in the art. One of the known water valves is openable by means of an adjusting wheel by hand through an auxiliary valve. A cam disc displaces an auxiliary closing member at the water inlet against a spring force. The auxiliary closing member releases the auxiliary valve seat and thereby provides a complete hydraulic opening of the main closing member under the action of the water pressure. Water flowing through the auxiliary valve seat drives a water motor arranged in the interior of the water valve housing and subsequently flows further to a water output, especially for watering plants.

Due to the water pressure difference before and after the main closing member, it hydraulically closes automatically when the auxiliary closing member closes the auxiliary valve seat. The main closing member is formed as a waved diaphragm with a small stroke clamped in the housing and closing with its edges a throughflow region as a cover. By lifting of the diaphragm from the throughflow region the water valve is opened.

When the diaphragm material is aged or foreign particles or impurities are settled on it, the diaphragm can open not completely in some situations, so that the water valve becomes untight. Moreover, the hydraulic opening of the water valve is performed more or less slow depending on the condition of the auxiliary valve.

In a further development of the known water valve the valve closing member is formed as a plate valve with a shaft. The valve plate corresponding to the diaphragm of the first known valve is composed of a bending-resistant, wear-resistant material and is fixedly connected with the shaft. The valve plate abuts with its periphery against the valve seat and the valve housing relative to the water input. The opening of the valve is performed not hydraulically, but instead only through adjusting means which act on the shaft and is displaceable together with the valve plate. Due to bending-resistant closing member there is no the danger here of untightness since impurities can be displaced and squashed. However, during opening of the valve the valve member must be moved against the pressure of the water with significant forces over the shaft. Depending on the height of the water pressure, the forces for opening of the valve, for example with very high pressure which is available in Germany, range from unpleasant to unbearable or at least reduce the operational comfort, affect the operation and increases wear between the movement transmitting parts and the valve closing body. The service life is reduced as well.

Further water valves are known in which switching time is controlled. Since it is dependent on the exterior energy, further disturbing factors are introduced, for example, they are less robust than the conventional water valves.

SUMMARY OF THE INVENTION

Accordingly, it is an object of the present invention to provide a water valve, which avoids the disadvantages of the prior art.

In keeping with these objects and with others which will become apparent hereinafter, one feature of the present invention resides, briefly stated, in a self-closing water valve in which the water closing member is coupled with an auxiliary valve which operates for reducing operating forces during opening of the valve, or in other words for releasing the valve seat from the valve closing member.

When the water valve is designed in accordance with the present invention, it has the advantage that the position of opening of the valve closing member designed as a valve plate is performed fast not hydraulically, but instead by outwardly controllable operating means directly in a so-called rigid manner. Advantageously, only low operating forces are needed for opening of the valve and therefore only low wear occurs at the fore transmitting locations. Therefore the danger of clamping or breakage especially due to rotational securing of the valve plate is eliminated. The water valve is operatable conveniently and quietly.

When the water valve is designed in accordance with the present invention it has the advantage as compared with the valves with switching time control, that they are not dependent on an outside energy and is less disturbance susceptible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
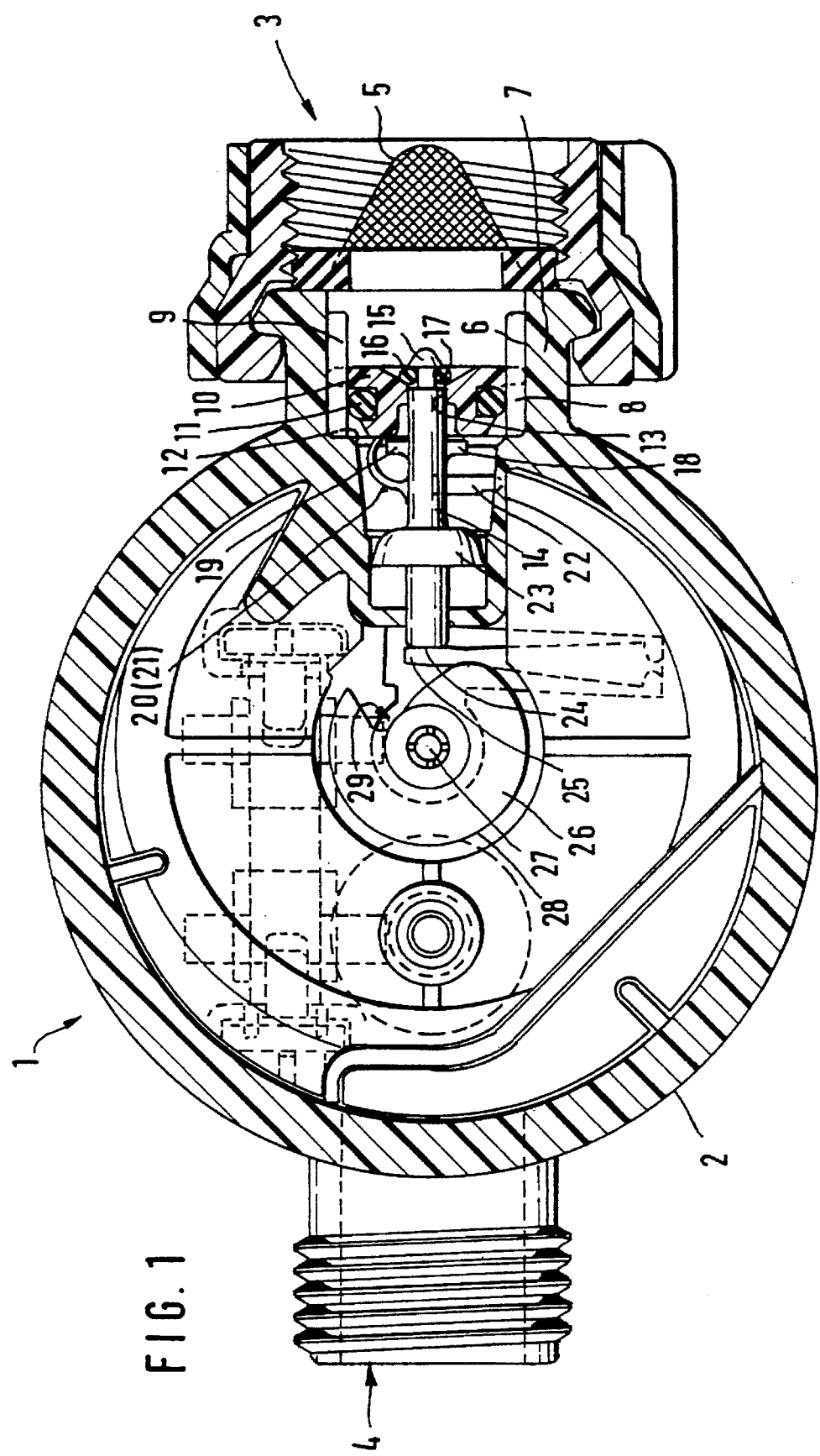
FIG. 1 is a view showing a cross-section of a water valve in accordance with the present invention in the open position.

A water valve which is shown in a cross-section in FIG. 1 is identified with reference numeral 1. It has a cylindrical housing 2 with a water inlet 3 and a water outlet 4. The water inlet 3 arranged at the right side in the drawing is provided with a filter 5 which retains the impurities. The water input 3 is formed by a stepped opening 6 of an inflow pipe 7. At least two opposite guiding ribs 8 and 9 are arranged in a longitudinal direction of the stepped opening 6. A valve closing member formed as a plate valve is axially displaceable in the stepped opening 6. A valve plate 10 of the plate valve is provided with a sealing ring 11 on its periphery and two pairs of claws each forming a groove engaging the guiding rib 8 or 9 and preventing the rotation of the valve plate 10. A conical narrowing of the stepped opening 6 forms a valve seat 12 so that the sealing ring 11 abuts against the valve seat. The valve plate 10 has a central opening 13.

A shaft 14 is axially dispalceably guided in the central opening 13. It has a free end 15 which faces the filter 5 and carries an auxiliary sealing ring 16 in a circular groove 17. The auxiliary ring 16 has a greater diameter than the central opening 13 and is supported concentrically relative to it against the side of the valve plate 10 which faces the water inlet 4. The shaft 14 has also a side which faces away from the filter 5 and is provided at this side with two radial, opposite transverse abutments 18 and 19. They limit an axial displacement of the valve plate 10 relative to the shaft 4. Two arcuate flat springs 20, 21 are formed from the shaft 14 at the side of the transverse abutments 18, 19 which faces away from the filter 5. The flat springs abut against the side of the valve plate 10 which faces away from the filter 5 and press it against the auxiliary sealing ring 16.

A holding arm 22 is formed on the shaft 14 and extends radially outwardly from the shaft and axially near the flat springs 20, 21. The shaft 14 is secured on the wall of the stepped opening 6 by the holding arm 22 so that the shaft cannot be lost. The holding arm 22 is guided in an additional opening 6' provided in the wall of the opening 6. The arm 22 can move free in the opening, but it cannot pass an edge 6". Therefore, the holding arm 22 operates as a securing member for the shaft 14. A part 23 is formed of one piece with the shaft 14 at an axial distance from the holding arm 22 at the side facing away from the filter 5. The part 23 is convexly curved toward the valve plate 10 and is formed as a piston or a bell. It serves as a hydraulic damping member during pressure fluctuations of the inflowing water and reduces impacts between the subsequently illustrated movement-transmitting parts of the water valve 1.

An abutment surface 24 is formed at the free end of the shaft 14 which faces away from the valve plate 10, and a transmission lever 25 abuts against the surface. At the side facing away from the abutment surface 24 the transmission lever 25 abuts against a cam disc 26 which is arranged rotatably around an axis 27. The cam disc 26 is rotatable by a turbine-like driven, not shown water motor and a transmission when the water valve 1 is opened by hand.

The cam disc 26 has a circular contour 28. This contour is interrupted by a stepped portion 29. One leg of the portion 29 extends radially and straight from the circular contour 28 inwardly, while the other leg merges into the circular contour 28 in a curved manner.

The operation of the water valve 1 is now explained with reference to FIG. 1.

In the shown position, the cam disc 26 abuts with its circular contour 28 against the transmission lever 29 and thereby displaces the shaft 14 in direction toward the filter 5. The valve plate 10 follows the displacement being acted upon by the two arcuate springs 20, 21 or the transverse abutments 18, 19. The sealing ring 11 is lifted from the valve seat 12 and the entering water can flow around the valve plate 10 and then through the stepped opening 6 through the housing 2 to drive the water motor and then flows through the water outlet 4 further to a not shown consumer, such as for example lawn sprinklers or the like.

The cam disc 26 rotates in dependence on the through-flowing water quantity. When the portion 29 reaches the transmission lever 25, it is arrested in the portion 29. Due to this movement directed to the left in the drawing, the shaft 14 also displaces to the left and closes the central opening 13 with the auxiliary sealing ring 16, and the valve plate 10 forcedly follows the same. In this position the further inflow of the water is interrupted by the sealing ring 11 abutting against the valve seat 12 or by the auxiliary sealing ring 16 abutting on the valve plate 10. Thereby the movement of the water motor is stopped. The cam disc 26 no longer rotates.

The water valve 1 remains closed until the cam disc 26 is again displaced by hand and the shaft 14 is displaced to the position of pre-opening.

Figure 3:
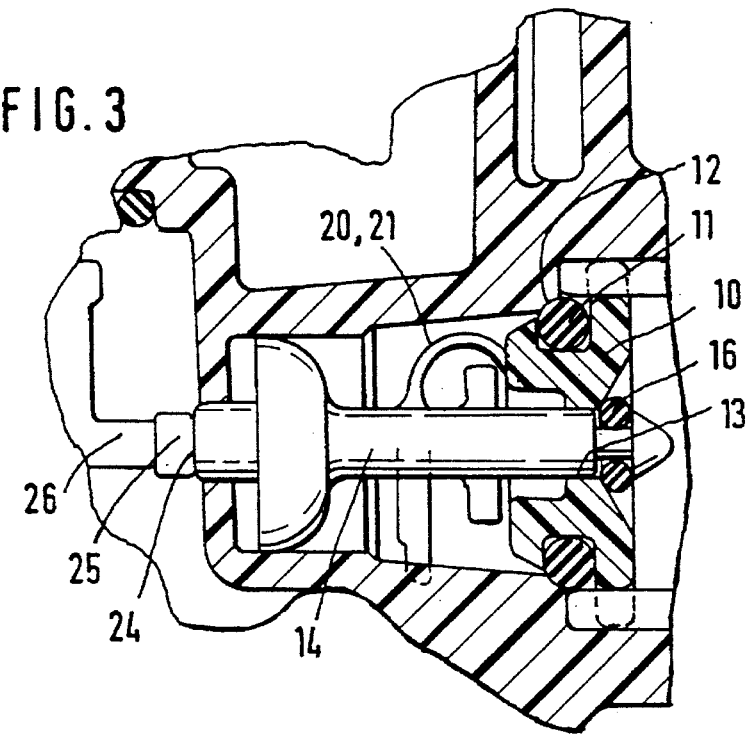
FIG. 3 is a view showing the inventive water valve in the closed position.

The cam disc 26 can be displaced by a random distance by hand through the transmission lever 25, in correspondence with the position of complete opening shown in FIG. 1 or in correspondence with the position of closing shown in FIG. 3. When the cam disc 26 is displaced so that it is supported substantially in the center of the circular contour 28 against the transmission lever 25, the cam disc 26 needs only a short stroke to the position of closing, or in other words, until the portion 29 faces the transmission lever 25. The closer is the supporting point of the transmission lever 25 on the portion 29, the smaller is the time over which the water valve remains open or the water quantity which is allowed to pass through the valve.

Figure 2:
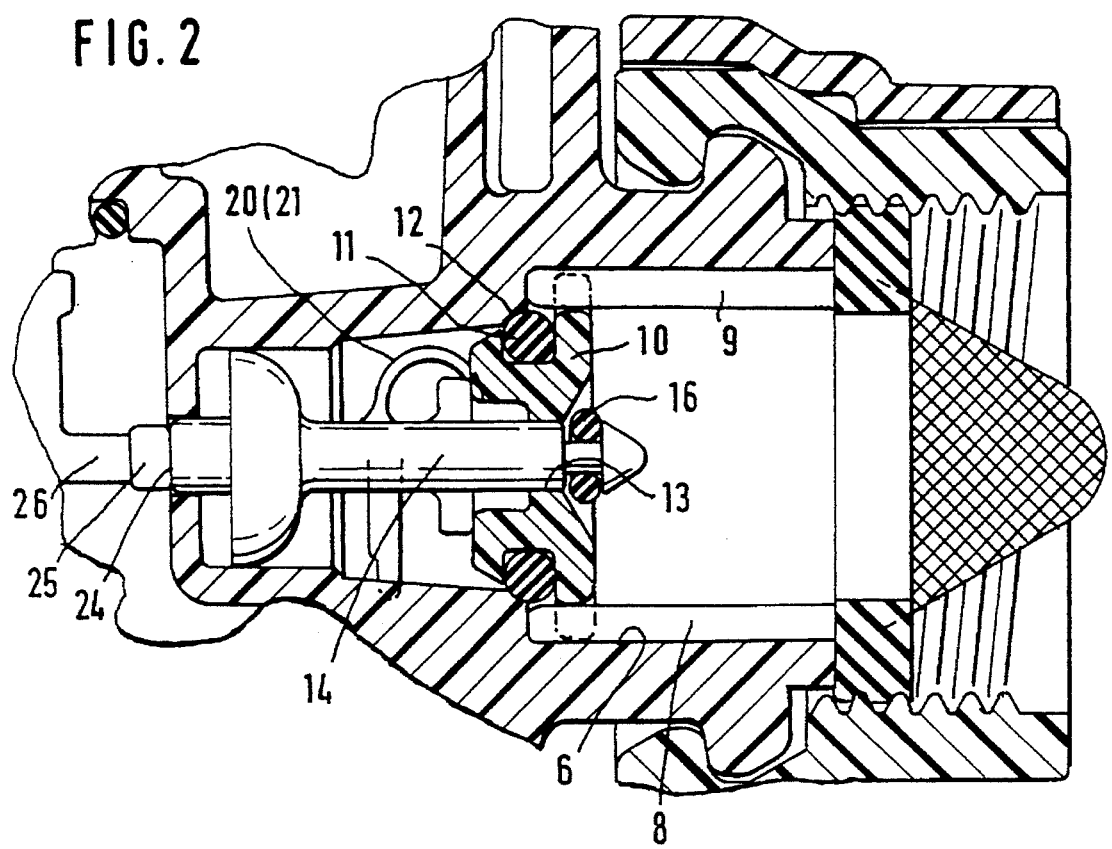
FIG. 2 is a view showing the inventive water valve in the section of FIG. 1, turned by 90° with the region of a valve closing member and a valve seat in the pre-opened position.

The valve plate 10 with the shaft 14 shown in a section on an enlarged scale in FIG. 2 are illustrated in the stepped opening 6 in the position of pre-opening. The sealing ring 11 abuts against the valve seat 12 in a sealing manner, but the shaft 14 is displaced relative to the valve plate 10 to the right so that a gap is formed between the auxiliary sealing ring 16 and the valve plate 10. The water accumulated in front of the valve plate 10 can flow through the gap into the housing 2. Thereby the pressure difference between the side of the valve plate 10 facing the filter 5 and the side of the valve plate facing away from the filter 5 is reduced. With low pressure differences it can easily move to the right than in condition of higher pressure differences. The shaft 14 with the auxiliary sealing ring 16 substantially facilitates the complete opening of the valve plate 10.

The water valve of FIG. 2 is shown in FIG. 3 in the position of closing. The sealing ring 11 closes the valve seat 12 and the auxiliary ring 16 closes the central opening 13.

Figure 4:
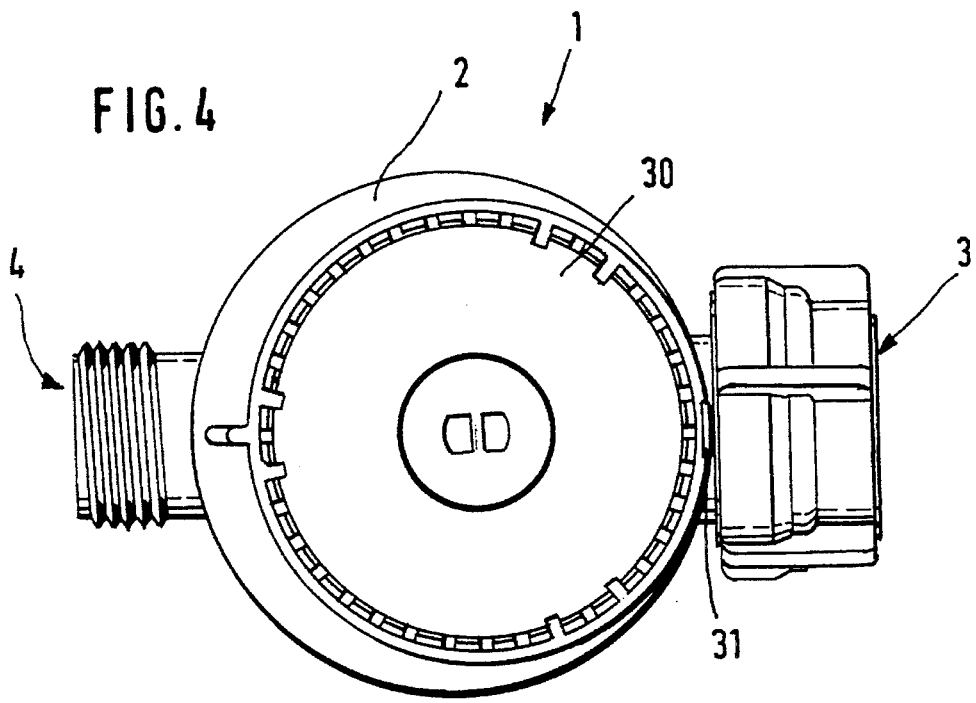
FIGS. 4 and 5 are a side view and a plan view of the water valve of the preceding Figures.
Figure 5:
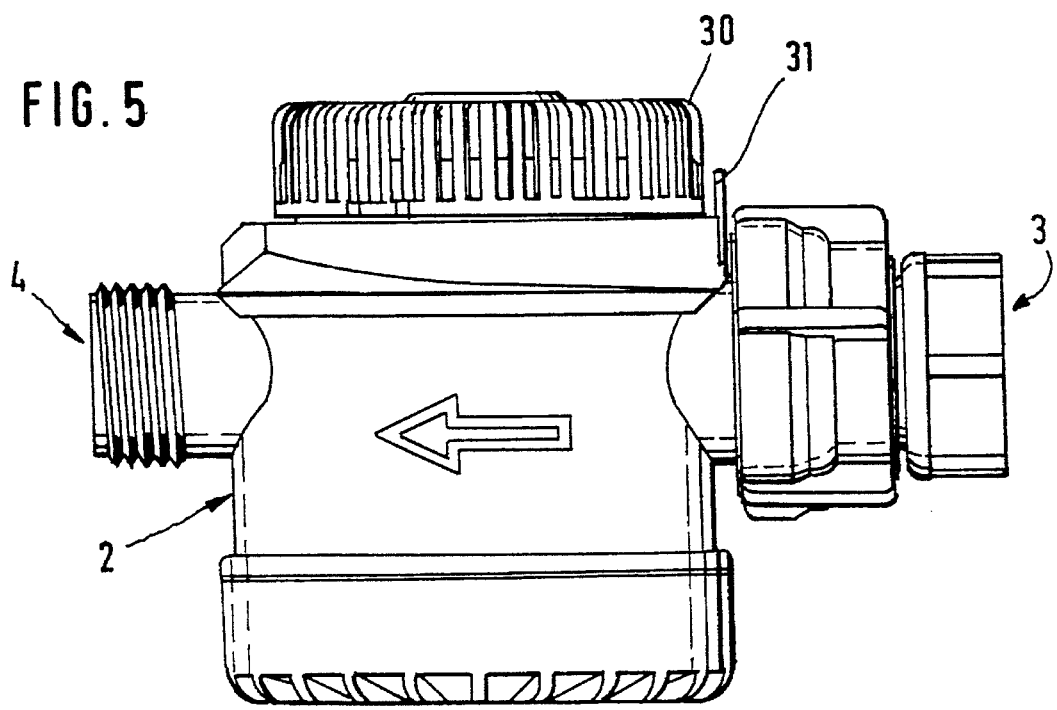

The side view of FIG. 4 and the plan view of FIG. 5 show the water valve 1 with its housing 2, water inlet 3, water outlet 4, as well as a hand adjusting wheel 30 for displacing the cam 26 and a marking tongue 31 for reproduceable adjustment of preselected positions of the hand adjusting wheel 30 associated with not shown scale parts provided on the hand adjusting wheel 30.

Figure 6:
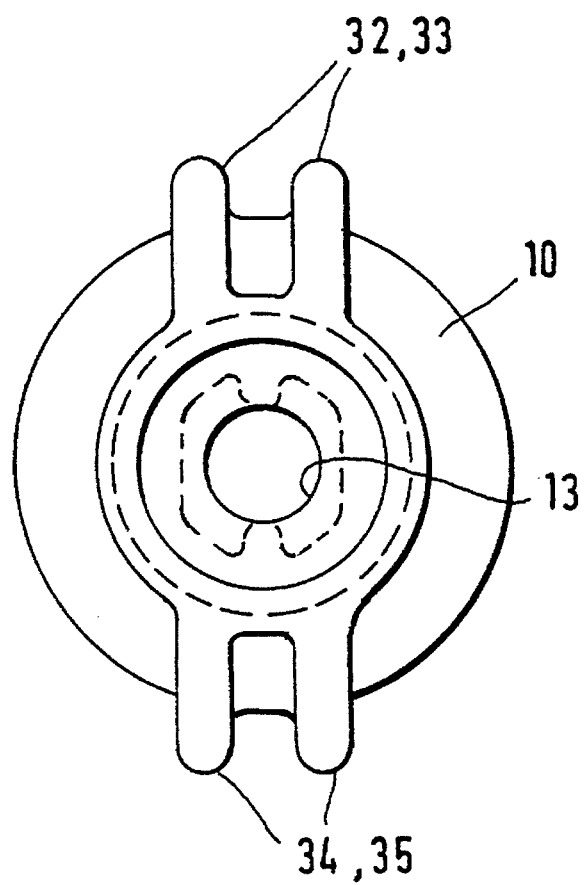
FIGS. 6 and 7 are views showing a valve closing member with its components including a valve plate and a shaft.
Figure 7:
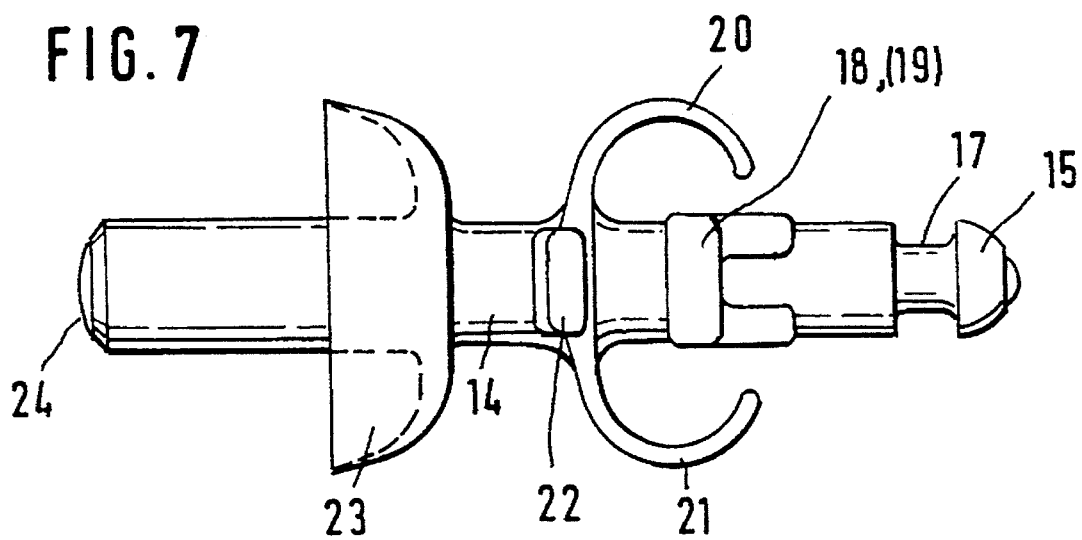

FIGS. 6 and 7 illustrate synthetic plastic parts of the water valve, including the valve plate 10 and the shaft 14 of the valve closing member. They are provided with the claws 32, 33, 34, 35 which form grooves engageable with the guiding ribs 8, 9 of FIG. 1 to secure the valve plate 10 from rotation. They also show the central opening 13 through which the shaft 14 is guided axially displaceably and carries at its free end 15 the auxiliary ring 16 in the groove 17 of FIG. 1. Finally, it shows two transverse abutments 18 (19), two arcuate flat springs 20, 21, the holding arm 22, the curved, piston-like or bell-like part 23, and the abutment surface 24.

It will be understood that each of the elements described above, or two or more together, may also find a useful application in other types of constructions differing from the types described above.

While the invention has been illustrated and described as embodied in a self-closing water valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-closing water valve, comprising a valve seat; a valve closing member cooperating with said valve seat so as to abut against and to be lifted from said valve seat; and an auxiliary valve coupled with said valve closing member for reducing operational forces during lifting of said valve closing member from said valve seat and therefore opening the valve, said valve closing member being formed as a valve plate provided with a shaft, said valve plate being provided with guiding means which prevent its rotation relative to said valve seat, said guiding means including opposite stationary guiding ribs provided inside a stroke region of said valve plate.

2. A self-closing water valve as defined in claim 1; and further comprising a water motor operated by water passing through the water valve.

3. A self-closing water valve as defined in claim 1, wherein said valve closing member supports said auxiliary valve.

4. A self-closing water valve as defined in claim 1, wherein said shaft is arranged movably relative to said valve plate so that said valve closing member forms said auxiliary valve.

5. A self-closing water valve as defined in claim 4, wherein said shaft has a free end carrying an auxiliary sealing ring, said valve plate having a central opening forming an auxiliary valve seat for said auxiliary sealing ring.

6. A self-closing water valve, comprising a valve seat; a valve closing member cooperating with said valve seat so as to abut against and to be lifted from said valve seat; and an auxiliary valve coupled with said valve closing member for reducing operational forces during lifting of said valve closing member from said valve seat and therefore opening the valve, said valve closing member being formed as a valve plate provided with a shaft, said shaft being arranged movably relative to said valve plate so that said valve closing member forms said auxiliary valve, said shaft having a free end carrying an auxiliary sealing ring, said valve plate having a central opening forming an auxiliary valve seat for said auxiliary sealing ring, said valve plate being provided with guiding means which prevent its rotation relative to said valve seat, said guiding means including opposite stationary guiding ribs provided inside a stroke region of said valve plate.

7. A self-closing water valve, comprising a valve seat; a valve closing member cooperating with said valve seat so as to abut against and to be lifted from said valve seat; and an auxiliary valve coupled with said valve closing member for reducing operational forces during lifting of said valve closing member from said valve seat and therefore opening the valve, said valve closing member being formed as a valve plate provided with a shaft, said shaft having spring means abutting against said valve plate and formed of one-piece with said shaft.

8. A self-closing water valve, comprising a valve seat; a valve closing member cooperating with said valve seat so as to abut against and to be lifted from said valve seat; and an auxiliary valve coupled with said valve closing member for reducing operational forces during lifting of said valve closing member from said valve seat and therefore opening the valve, said valve closing member being formed as a valve plate provided with a shaft, said shaft being arranged movably relative to said valve plate so that said valve closing member forms said auxiliary valve, said shaft having a free end carrying an auxiliary sealing ring, said valve plate having a central opening forming an auxiliary valve seat for said auxiliary sealing ring, said shaft having spring means abutting against said valve plate and formed of one-piece with said shaft.

9. A self-closing water valve, comprising a valve seat; a valve closing member cooperating with said valve seat so as to abut against and to be lifted from said valve seat; and an auxiliary valve coupled with said valve closing member for reducing operational forces during lifting of said valve closing member from said valve seat and therefore opening the valve, said valve closing member being formed as a valve plate provided with a shaft, said shaft carrying a bell-like part which is formed as a hydraulic piston for return damping during pressure fluctuations and is formed of one piece with said shaft.

\* \* \* \* \*